(12) United States Patent
Xu et al.

(10) Patent No.: US 10,291,581 B2
(45) Date of Patent: May 14, 2019

(54) METHOD AND SYSTEM FOR REDUCING PIM PROTOCOL DR CHANGE

(71) Applicant: ZTE CORPORATION, Shenzhen City, Guangdong Province (CN)

(72) Inventors: Benchong Xu, Shenzhen (CN); Xiaoli Ji, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 15/557,467

(22) PCT Filed: Aug. 18, 2015

(86) PCT No.: PCT/CN2015/087389
§ 371 (c)(1),
(2) Date: Sep. 11, 2017

(87) PCT Pub. No.: WO2016/145782
PCT Pub. Date: Sep. 22, 2016

(65) Prior Publication Data
US 2018/0069830 A1    Mar. 8, 2018

(30) Foreign Application Priority Data
Mar. 19, 2015 (CN) .......................... 2015 1 0124772

(51) Int. Cl.
H04L 29/12    (2006.01)
H04L 12/751    (2013.01)
H04L 12/761    (2013.01)

(52) U.S. Cl.
CPC ........ *H04L 61/2069* (2013.01); *H04L 45/026* (2013.01); *H04L 61/6004* (2013.01); *H04L 45/16* (2013.01)

(58) Field of Classification Search
CPC combination set(s) only.
See application file for complete search history.

(56) References Cited

U.S. PATENT DOCUMENTS

2002/0150094 A1    10/2002    Cheng et al.
2006/0268869 A1*    11/2006    Boers ...................... H04L 45/00
                                                                               370/390
(Continued)

FOREIGN PATENT DOCUMENTS

CN    101651609 A    2/2010
CN    102238074 A    11/2011
(Continued)

OTHER PUBLICATIONS

Wang, Yuanming, "A PIM-SSM-based multicast algorithm for MPLS VPN", Study on Optical Communications, No. 2, Apr. 30, 2011, pp. 14-16.

*Primary Examiner* — Hicham B Foud
(74) *Attorney, Agent, or Firm* — Ling Wu; Stephen Yang; Ling and Yang Intellectual Property

(57) ABSTRACT

A method and system for reducing changes in a designated router (DR) of a protocol independent multicast (PIM) protocol are disclosed. The method includes: after a PIM device joins a shared network, an interface of the PIM device receiving a Hello message sent by other PIM device in the shared network, wherein the Hello message carries a DR address option; and the interface of the PIM device using a currently used DR address carried in the Hello message as a DR address of the interface.

17 Claims, 2 Drawing Sheets

---

S1: After a PIM device joins a shared network, an interface of the PIM device receives a Hello message sent by other PIM device in the shared network; herein the Hello message carries a DR address option

↓

S2: The interface of the PIM device uses a currently used DR address carried in the Hello message as a DR address of the interface

(56) References Cited

U.S. PATENT DOCUMENTS

| | | |
|---|---|---|
| 2007/0165632 A1 | 7/2007 | Zwiebel |
| 2008/0049763 A1* | 2/2008 | Damm ................ H04L 12/4625 370/400 |
| 2008/0259913 A1* | 10/2008 | Shah ..................... H04L 12/185 370/386 |
| 2014/0254591 A1 | 9/2014 | Mahadevan et al. |
| 2016/0006646 A1* | 1/2016 | Lin ..................... H04L 12/6418 370/390 |

FOREIGN PATENT DOCUMENTS

| | | |
|---|---|---|
| CN | 103227724 A | 7/2013 |
| EP | 2012461 A1 | 1/2009 |

* cited by examiner

METHOD AND SYSTEM FOR REDUCING PIM PROTOCOL DR CHANGE

TECHNICAL FIELD

This document relates to the field of communication technologies, and more particularly, to a method and system for reducing changes in a designated router (DR) of a protocol independent multicast (PIM) protocol and a computer readable storage medium.

BACKGROUND

In a shared network, such as an Ethernet, a designated router (DR) is elected by a protocol independent multicast (PIM) protocol. An interface considers itself to be a DR by default after start-up. And after the interface receives a Hello message, DR is reelected to select a new DR. A message indicating that a user of an Internet Group Management Protocol (IGMP) or Multicast Listener Discovery Protocol (MLD) joins or quits a group will be received by all devices in the network, and the DR is responsible for forwarding multicast traffic to users in the network.

When a PIM device is newly added to the network, it is possible to cause a change of the DR. Specifically, when the newly added PIM device is elected as the DR, the original DR will not forward traffic. However, since the new DR does not learn full IGMP or MLD user information, packet loss will be caused. When the newly added PIM device learns the IGMP or MLD user information first, and then other PIM neighbors are discovered, there will be double traffics. The existing art is intended to perceive the change of the DR as earlier as possible to learn the IGMP or MLD user information as soon as possible, therefore the problem described above cannot be solved fundamentally.

SUMMARY

The following is a summary of the subject matter described herein in detail. This summary is not intended to limit the protection scope of the claims. An embodiment of the present disclosure discloses a method for reducing changes in a DR of a PIM protocol including the following steps: after a PIM device joins a shared network, receiving, by an interface of the PIM device, a Hello message sent by other PIM device in the shared network, herein the Hello message carries a DR address option; and using, by the interface of the PIM device, a currently used DR address carried in the Hello message as a DR address of the interface.

In an exemplary embodiment, the method for reducing changes in a DR of a PIM protocol further includes: after the PIM device joins the shared network, and before the interface of the PIM device receives the Hello message sent by other PIM device in the shared network, entering, by the interface of the PIM device, a wait state and starting a wait state timer, and sending, by the PIM device, a Hello message carrying the DR address option.

In an exemplary embodiment, in the DR address option carried in the Hello message sent by the PIM device, a DR address is 0 or empty.

In an exemplary embodiment, the method for reducing changes in a DR of a PIM protocol further includes: after the wait state timer of the interface of the PIM device times out, or after the interface of the PIM device receives a Hello message which carries the DR address option and in which a DR address is a legal unicast address, ending the wait state of the interface of the PIM device and entering a DR election state.

In an exemplary embodiment, after the wait state timer of the interface of the PIM device times out, the interface of the PIM device elects a new DR and sends a Hello message carrying an address of the newest DR.

In an exemplary embodiment, using, by the interface of the PIM device, a currently used DR address carried in the Hello message as a DR address of the interface includes: after the interface of the PIM device receives a Hello message which carries the DR address option and in which a DR address is a legal unicast address, using, by the interface of the PIM device, the received DR address as the DR address of the interface.

An embodiment of the present disclosure further provides a system for reducing changes in a DR of a PIM protocol, provided in a PIM device and including a message transceiving module and a protocol processing module. The message transceiving module is configured to, after the PIM device joins a shared network, receive a Hello message sent by other PIM device in the shared network, herein the Hello message carries a DR address option. The protocol processing module is configured to use a currently used DR address carried in the Hello message as a DR address of an interface of the PIM device.

In an exemplary embodiment, the system for reducing changes in a DR of a PIM protocol further includes a state management module configured to, after the PIM device joins the shared network and before the interface of the PIM device receives the Hello message sent by other PIM device in the shared network, make the interface of the PIM device enter a wait state, start a wait state timer, and notify the message transceiving module to send a Hello message which carries the DR address option and in which a DR address is 0 or empty.

In an exemplary embodiment, the state management module is further configured to, after the wait state timer of the interface of the PIM device times out, or after the message transceiving module receives a Hello message which carries the DR address option and in which a DR address is a legal unicast address, end the wait state of the interface of the PIM device and enter a DR election state.

In an exemplary embodiment, the protocol processing module is further configured to, after the wait state timer of the interface of the PIM device times out, elect a new DR and notify the message transceiving module to send a Hello message carrying an address of the newest DR.

Herein, the protocol processing module using the currently used DR address carried in the Hello message as the DR address of the interface of the PIM device includes that the protocol processing module is configured to, after the message transceiving module receives the Hello message which carries the DR address option and in which the DR address is the legal unicast address, use the DR address carried in the received Hello message as the DR address of the interface of the PIM device.

An embodiment of the present disclosure further provides a computer readable storage medium having program instructions stored therein, and when executed, the program instructions can implement the method for reducing changes in the DR of the PIM protocol provided by the embodiment of the present disclosure.

Compared with the existing art, in embodiments of the present disclosure, the DR address option is newly added to the PIM Hello message, and carries the DR address currently used by the interface, and the PIM device joining the shared network learns and uses the DR in the original network through the Hello message, thereby avoiding the reelection of the DR, reducing changes of the DR and supplementing beneficially the standard RFC4601. The problem that the PIM device joining the shared network causes a change of the DR and further affects user traffic is solved without being influenced by routing convergence performance and routing capacities.

After the accompanying drawings and detailed description are read and understood, other aspects can be understood.

DETAILED DESCRIPTION

To make objects, technical schemes and advantages of embodiments of the present disclosure more clear, a method thereof will be described in detail, and the embodiments of the present disclosure will be described in further detail in conjunction with the accompanying drawings. A portion which is not illustrated specifically is consistent with protocol actions specified in the standard RFC4601.

Figure 1:
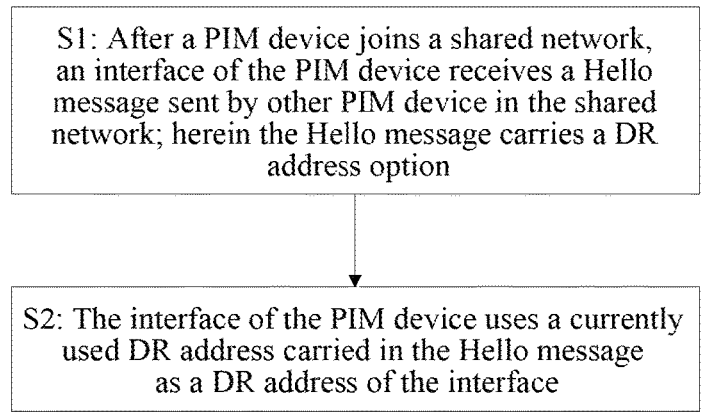
FIG. 1 is a flow chart of a method for reducing changes in a DR of a PIM protocol disclosed in an embodiment of the present disclosure.

As shown in FIG. 1, a method for reducing changes in a DR of a PIM protocol disclosed in an embodiment of the present disclosure includes the following steps. In step S1, after a PIM device joins a shared network, an interface of the PIM device receives a Hello message sent by other PIM device in the shared network. Herein the Hello message carries a DR address option. In step S2, the interface of the PIM device uses a currently used DR address carried in the Hello message as a DR address of the interface. And the currently used DR address carried in the Hello message refers to the DR address currently used by other PIM device sending the Hello message.

In an exemplary embodiment, the method for reducing the changes in the DR of the PIM protocol further includes that: after the PIM device joins the shared network, and before the interface of the PIM device receives the Hello message sent by other PIM device in the shared network, the interface of the PIM device enters a wait state and starts a wait state timer, and the PIM device sends a Hello message carrying the DR address option. In the DR address option carried in the Hello message sent by the PIM device, the DR address is 0 or empty.

In an exemplary embodiment, the method for reducing the changes in the DR of the PIM protocol further includes that: after the wait state timer of the interface of the PIM device times out, or after the interface of the PIM device receives a Hello message which carries the DR address option and in which a DR address is a legal unicast address, the wait state of the interface of the PIM device ends and a DR election state is entered, indicating that the interface of the PIM device can perform a DR election. Specifically, after the wait state timer of the interface of the PIM device times out, the interface of the PIM device elects a new DR and sends a Hello message carrying an address of the newest DR, i.e., sends a Hello message carrying the DR address option. Herein the DR address is the address of the newest DR. After the interface of the PIM device receives a Hello message which carries the DR address option and in which a DR address is a legal unicast address, the interface of the PIM device uses the received DR address as the DR address of the interface.

Figure 2:
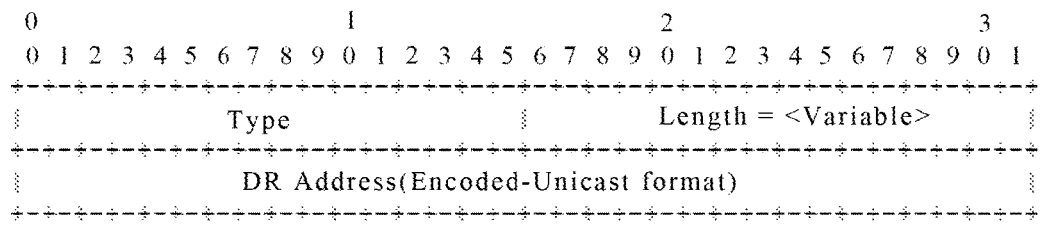
FIG. 2 is a structure diagram of a DR address option of a Hello message disclosed in an embodiment of the present disclosure.

FIG. 2 is a structure diagram of a newly-added DR address option of a PIM Hello message. As shown in FIG. 2, fields in the structure of the DR address option are defined as below.

Type: the type is not limited by the present disclosure and may be any one (36-65535) of undefined option types of the Hello message.

Length: the length is a variable length.

DR address: the DR address uses an encoded-unicast format specified in the standard RFC4601 4.9.1.

Herein, fields of the encoded-unicast format include Addr Family, Encoding Type and Unicast Address, which are explained in detail in the standard RFC4601 4.9.1. Here, the meaning of an address 0 below is that a legal address family is filled in the Addr Family field, any value may be filled in the Encoding Type field and 0 is filled in the Unicast Address field.

In the embodiment, a change of the state of the interface of the PIM device includes the following five events.

Event E1: the interface is up, which means here that the interface starts up and there is a legal IP address. After the event E1 is triggered, the interface enters a wait state while starting a wait state timer.

Event E2: the interface receives a Hello message which carries the DR address option and in which the DR address is 0. After the event E2 is triggered, the interface keeps the original state. If the interface is in a DR election state, its own DR address of the interface needs to be sent through a Hello message.

Event E3: the interface receives a Hello message which carries the DR address option and in which the DR address is a legal unicast address. After the event E3 is triggered, the interface enters the DR election state and uses the DR address carried in the received Hello message as its own DR. When the interface finds that its own DR is changed, the interface should send a Hello message carrying an address of the newest DR.

Event E4: the wait state timer of the interface times out. After the event E4 is triggered, the interface enters the DR election state, elects a DR according to a DR election procedure specified in the standard RFC4601, and then the interface sends a Hello message carrying an address of the newest DR.

Event E5: the interface is down, which means here that the IP address of the interface is invalid or the interface is down. After the event E5 is triggered, the interface enters an initialization state.

In the wait state, the sent Hello message is a Hello message which carries the DR address option and in which the DR address is 0; and the DR is not elected in this state. In the DR election state, the sent Hello message is a Hello message which carries the DR address option and in which the DR address is a legal unicast address.

The method disclosed in the embodiment of the present disclosure will be described below in detail based on a multicast network topology shown in FIG. 3.

Figure 3:
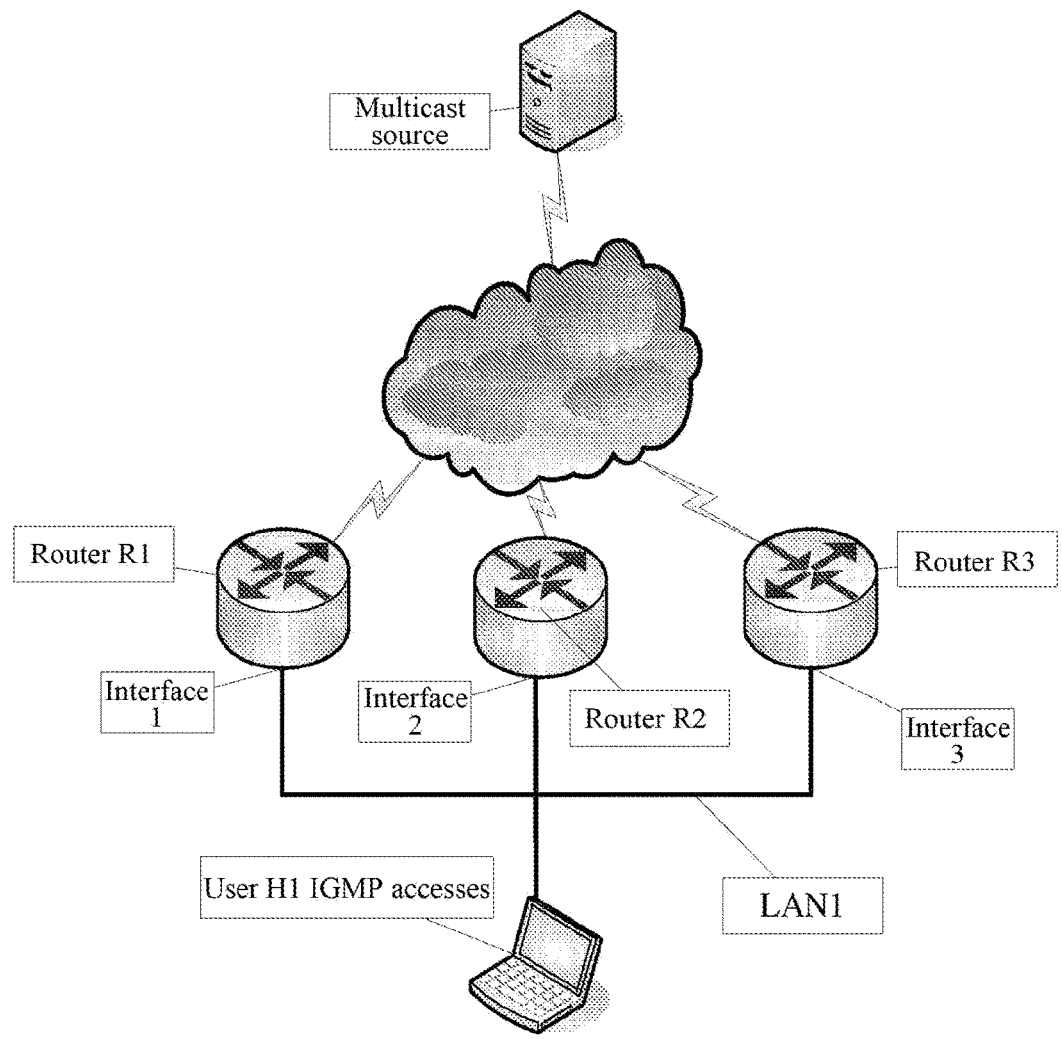
FIG. 3 is a schematic diagram of a multicast network topology disclosed in an embodiment of the present disclosure.

As shown in FIG. 3, in a shared network LAN1 (local area network, LAN) in which three PIM routers R1-R3 are connected with an IGMP user H1, according to a time sequence the followings will be analyzed in detailed. That is, an interface 1 of the PIM router R1 starts up, and an interface 2 of the PIM router R2 starts up, and a wait state timer of the interface 1 of the PIM router R1 times out, and an interface 3 of the PIM router R3 starts up, and the interface 1 of the PIM router R1 is down. Herein, the DR priority is as follows: the priority of the interface 3 of the PIM router R3 is higher than that of the interface 1 of the PIM router R1, and the priority of the interface 1 of the PIM router R1 is higher than that of the interface 2 of the PIM router R2.

A processing process for responses to different triggering events in the network through the PIM routers R1-R3 in the network and the user device H1 will be described below.

In step 3.1, the interface 1 of the PIM router R1 is triggered by the event E1, and the interface 1 starts up and then enters the wait state while starting a wait state timer and sending a Hello message which carries a DR address option and in which the DR address is 0. At this point, this interface is in the wait state and does not elect the DR.

In step 3.2, the interface 2 of the PIM router R2 is triggered by the event E1, the action of which is the same as the action of the start-up of the interface 1 of the PIM router R1 in the step 3.1.

In step 3.3, after receiving the Hello message sent by the interface 2 of the PIM router R2, the interface 1 of the PIM router R1 is triggered by the event E2, establishes a PIM neighbor normally while discovering that the address of the DR address option is 0 and the interface is in the wait state, keeps the wait state and does not elect the DR.

In step 3.4, the wait state of the interface 1 of the PIM router R1 times out, and the interface 1 of the PIM router R1 is triggered by the event E4, enters the DR election state, elects the interface 1 of the PIM router R1 as the DR of the shared network LAN1, and then sends a Hello message carrying the address of the newest DR.

In step 3.5, after the DR is elected, in a scene where a user of an IGMP or MLD joins, the DR forwards multicast traffic to the shared network LAN1.

In step 3.6, after receiving the Hello message sent by the interface 1 of the PIM router R1, the interface 2 of the PIM router R2 is triggered by the event E3, enters the DR election state, and uses the DR address carried in the received Hello message as its own DR while sends a Hello message carrying the address of the newest DR.

In step 3.7, the interface 3 of the PIM router R3 is triggered by the event E1, the action of which is the same as the action of the start-up of the interface 1 of the PIM router R1 in the step 3.1.

In step 3.8, after receiving the Hello message sent by the interface 3 of the PIM router R3, the interface 1 of the PIM router R1 and the interface 2 of the PIM router R2 discover that it is a new neighbor and will both send the Hello message carrying the address of the newest DR immediately.

In step 3.9, the interface 3 of the PIM router R3 receives the Hello message sent by the interface 1 of the PIM router R1 or the interface 2 of the PIM router R2, and is triggered by the event E3, the action of which is the same as the action of the PIM router R2 in the step 3.6. The DR in the shared network is still the interface 1 of the PIM router R1.

In step 3.10, the interface 1 of the PIM router R1 is down, and is triggered by the event E5, and sends a Hello message in which a holdtime is 0 according to the PIM protocol.

In step 3.11, after receiving the Hello message sent by the interface 1 of the PIM router R1 in the step 3.10, both the interface 2 of the PIM router R2 and the interface 3 of the PIM router R3 will reelect the DR, and will elect the interface 3 of the PIM router R3 with the higher priority as the DR, and send the Hello message carrying the address of the newest DR. The new DR begins to be responsible for forwarding multicast traffic to the shared network LAN1.

In the embodiment, a reference value of the time-out time of the wait state may be the default neighbor holdtime (described in detail in the section Default Hello Holdtime in the standard RFC4601 4.11), which is 105S by default. However, the present disclosure is not limited thereto.

In the embodiment, a reference value of the option type of the DR priority of the Hello message may be 36, or may be other reference values, and the specific types are not limited by the embodiment of the present disclosure.

In addition, when the Hello message not carrying the DR address option is received in a shared network and before a neighbor created by this message times out, the DR election is processed according to the specification of the standard RFC4601, and the embodiment of the present disclosure is not limited thereto.

Additionally, an embodiment of the present disclosure further discloses a system for reducing changes in a DR of a PIM protocol, provided in a PIM device and including a message transceiving module and a protocol processing module. The message transceiving module is configured to, after the PIM device joins a shared network, receive a Hello message sent by other PIM device in the shared network, herein the Hello message carries a DR address option. The protocol processing module is configured to use a currently used DR address carried in the Hello message as a DR address of an interface of the PIM device.

In an exemplary embodiment, the system for reducing the changes in the DR of the PIM protocol further includes a state management module configured to, after the PIM device joins the shared network and before the interface of the PIM device receives the Hello message sent by the other PIM device in the shared network, make the interface of the PIM device enter a wait state, start a wait state timer, and send a Hello message which carries the DR address option and in which the DR address is 0 or empty through the message transceiving module.

In an exemplary embodiment, the state management module is further configured to, after the wait state timer of the interface of the PIM device times out, or after the message transceiving module receives a Hello message which carries the DR address option and in which the DR address is a legal unicast address, end the wait state of the interface of the PIM device and enter a DR election state. Specifically, the protocol processing module is further configured to, after the wait state timer of the interface of the PIM device times out, elect a new DR and sends a Hello message carrying an address of the newest DR through the message transceiving module. The protocol processing module is configured to, after the message transceiving module receives the Hello message which carries the DR address option and in which the DR address is the legal unicast address, use the received DR address as the DR address of the interface of the PIM device.

In addition, the specific operating process of the system for reducing the changes in the DR of the PIM protocol disclosed in the embodiment of the present disclosure is the same as contents recorded in the method for reducing the changes in the DR of the PIM protocol disclosed above.

An embodiment of the present disclosure further provides a computer readable storage medium having program instructions stored therein, and when executed, the program instructions can implement the method for reducing changes in the DR of the PIM protocol in accordance with the embodiment of the present disclosure.

In summary, in the embodiments of the present disclosure, the DR address option is newly added to the PIM Hello message, and the DR address option carries the DR address currently used by the interface itself, and after joining the shared network, the PIM device learns and uses the DR in the original network through the Hello message, thereby avoiding the reelection of the DR and reducing changes of the DR. Embodiments of present disclosure is a beneficial supplement for the standard RFC4601.

People having ordinary skill in the art may understand that all or part of steps in the embodiments described above can be carried out by using a computer program process. The computer program may be stored in a computer readable storage medium. The computer program, when executed on the corresponding hardware platform (such as system, device, apparatus and component), includes one or a combination of steps in the method embodiments.

In an exemplary embodiment, all or part of steps in the embodiments described above may be carried out by using integrated circuits. These steps may be implemented by making individual integrated circuit modules or by making a plurality of modules thereof into a single integrated circuit module.

Various apparatuses/functional modules/functional units in the embodiments described above, may be implemented by using general computing apparatuses, and they can be centralized on a single computing apparatus or distributed on a network formed by multiple computing apparatuses.

Various apparatuses/functional modules/functional units in the embodiments described above, when implemented in a form of software functional module and sold or used as an independent product, may be stored in a computer readable storage medium. The computer readable storage medium mentioned above may be a read-only memory, a magnetic disk or an optical disk, etc.

INDUSTRIAL APPLICABILITY

The embodiments of the present disclosure solve the problem that the PIM device joining the shared network causes a change of the DR and further affects user traffic, and the embodiments of the present disclosure are not influenced by routing convergence performance and routing capacities.

What we claim is:

1. A method for reducing changes in a designated router, DR, of a protocol independent multicast, PIM, protocol, comprising the following steps:
after a PIM device joins a shared network, receiving, by an interface of the PIM device, a Hello message sent by other PIM device in the shared network, wherein the Hello message carries a DR address option; and
using, by the interface of the PIM device, a currently used DR address carried in the Hello message as a DR address of the interface.

2. The method for reducing changes in a DR of a PIM protocol according to claim 1, further comprising: after the PIM device joins the shared network, and before the interface of the PIM device receives the Hello message sent by other PIM device in the shared network, entering, by the interface of the PIM device, a wait state and starting a wait state timer, and sending, by the PIM device, a Hello message carrying the DR address option.

3. The method for reducing changes in a DR of a PIM protocol according to claim 2, wherein in the DR address option carried in the Hello message sent by the PIM device, a DR address is 0 or empty.

4. The method for reducing changes in a DR of a PIM protocol according to claim 2, further comprising: after the wait state timer of the interface of the PIM device times out, or after the interface of the PIM device receives a Hello message which carries the DR address option and in which a DR address is a legal unicast address, ending the wait state of the interface of the PIM device and entering a DR election state.

5. The method for reducing changes in a DR of a PIM protocol according to claim 4, wherein after the wait state timer of the interface of the PIM device times out, the interface of the PIM device elects a new DR and sends a Hello message carrying an address of the newest DR.

6. The method for reducing changes in a DR of a PIM protocol according to claim 1, wherein the using, by the interface of the PIM device, a currently used DR address carried in the Hello message as a DR address of the interface comprises: after the interface of the PIM device receives a Hello message which carries the DR address option and in which a DR address is a legal unicast address, using, by the interface of the PIM device, the DR address carried by the received Hello message as the DR address of the interface.

7. A system for reducing changes in a designated router, DR, of a protocol independent multicast, PIM, protocol, provided in a PIM device and comprising a processor and a storage device, wherein the storage device stores processor-executable programs, and the processor-executable programs comprise a message transceiving module and a protocol processing module, wherein
the message transceiving module is configured to, after the PIM device joins a shared network, receive a Hello message sent by other PIM device in the shared network, wherein the Hello message carries a DR address option; and
the protocol processing module is configured to use a currently used DR address carried in the Hello message as a DR address of an interface of the PIM device.

8. The system for reducing changes in a DR of a PIM protocol according to claim 7, the processor-executable programs further comprise a state management module configured to, after the PIM device joins the shared network, make the interface of the PIM device enter a wait state, start a wait state timer, and notify the message transceiving module to send a Hello message which carries the DR address option and in which a DR address is 0 or empty.

9. The system for reducing changes in a DR of a PIM protocol according to claim 8, wherein the state management module is further configured to, after the wait state timer of the interface of the PIM device times out, or after the message transceiving module receives a Hello message which carries the DR address option and in which a DR address is a legal unicast address, end the wait state of the interface of the PIM device and enter a DR election state.

10. The system for reducing changes in a DR of a PIM protocol according to claim 9, wherein the protocol processing module is further configured to, after the wait state timer of the interface of the PIM device times out, elect a new DR and notify the message transceiving module to send a Hello message carrying an address of the newest DR.

11. The system for reducing changes in a DR of a PIM protocol according to claim 9, wherein the protocol processing module using the currently used DR address carried in the Hello message as the DR address of the interface of the PIM device comprises that the protocol processing module is configured to, after the message transceiving module receives the Hello message which carries the DR address option and in which the DR address is the legal unicast address, use the DR address carried in the received Hello message as the DR address of the interface of the PIM device.

12. A non-transitory computer readable storage medium having program instructions stored therein, which, when executed, can implement the method for reducing changes in the DR of the PIM protocol according to claim 1.

13. A non-transitory computer readable storage medium having program instructions stored therein, which, when executed, can implement the method for reducing changes in the DR of the PIM protocol according to claim 2.

14. A non-transitory computer readable storage medium having program instructions stored therein, which, when executed, can implement the method for reducing changes in the DR of the PIM protocol according to claim 3.

15. A non-transitory computer readable storage medium having program instructions stored therein, which, when executed, can implement the method for reducing changes in the DR of the PIM protocol according to claim 4.

16. A non-transitory computer readable storage medium having program instructions stored therein, which, when executed, can implement the method for reducing changes in the DR of the PIM protocol according to claim 5.

17. A non-transitory computer readable storage medium having program instructions stored therein, which, when executed, can implement the method for reducing changes in the DR of the PIM protocol according to claim 6.

* * * * *